United States Patent [19]

Sturgill

[11] 4,080,291
[45] Mar. 21, 1978

[54] CLEANING DEVICE FOR SEDIMENTATION TANK

[75] Inventor: James Raymond Sturgill, Charlotte, N.C.

[73] Assignee: Hi-Ran, Ltd., Charlotte, N.C.

[21] Appl. No.: 765,271

[22] Filed: Feb. 3, 1977

[51] Int. Cl.² ............................................. B01D 21/04
[52] U.S. Cl. .............................. 210/143; 191/12.2 R; 210/527; 210/533
[58] Field of Search ............... 210/523, 525, 526, 527, 210/532 A, 532 S, 533, 298, 143; 191/1.2 R, 12 R; 318/480

[56] References Cited

U.S. PATENT DOCUMENTS

| | | | |
|---|---|---|---|
| 2,219,007 | 10/1940 | Dostal | 210/523 X |
| 2,866,557 | 12/1958 | Easterday | 210/527 |
| 3,328,661 | 6/1967 | Grebe | 318/480 X |
| 3,412,862 | 11/1968 | Chaplin | 210/523 X |
| 3,433,361 | 3/1969 | Ades | 210/526 X |
| 3,464,859 | 9/1969 | Hamrick | 55/DIG. 8 |
| 3,853,209 | 12/1974 | Bond | 210/527 X |
| 3,940,577 | 2/1976 | Christofer | 191/12.2 R X |

FOREIGN PATENT DOCUMENTS 18,569 of 1903 United Kingdom ................. 210/527

Primary Examiner—William A. Cuchlinski, Jr.
Attorney, Agent, or Firm—Bell, Seltzer, Park & Gibson

[57] ABSTRACT

A cleaning device for a water treatment sedimentation tank and characterized by the highly efficient removal of the sediment from the bottom of the tank and without requiring the draining thereof, and which comprises a cleaning assembly positioned within the tank and adapted to reciprocate along the floor to move the sediment into one or more gutters. The cleaning assembly is supported upon rails mounted along the lower portion of the side walls of the tank, and it is driven by a direct drive system which includes a rack carried by each rail, a submersible electric motor carried by the cleaning assembly, and a drive shaft rotatably mounted on the assembly and having a pinion at each end which operatively engages the adjacent rack. The cleaning assembly further includes a pair of spaced apart guide rollers at each of its ends, with each pair being positioned to engage the side edge of the adjacent supporting rail at spaced points to thereby maintain the accurate alignment of the assembly within the tank during its reciprocation.

13 Claims, 11 Drawing Figures

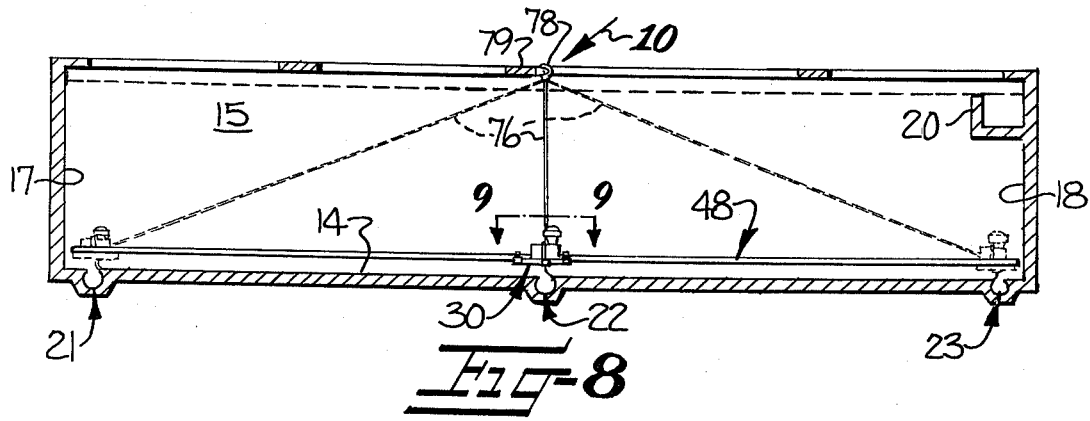
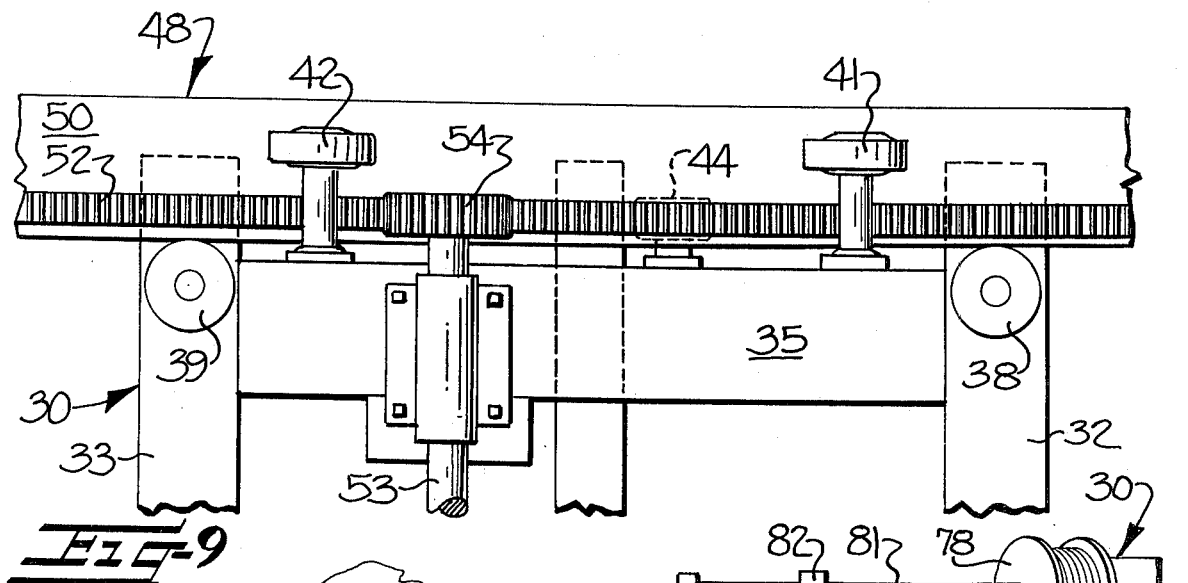
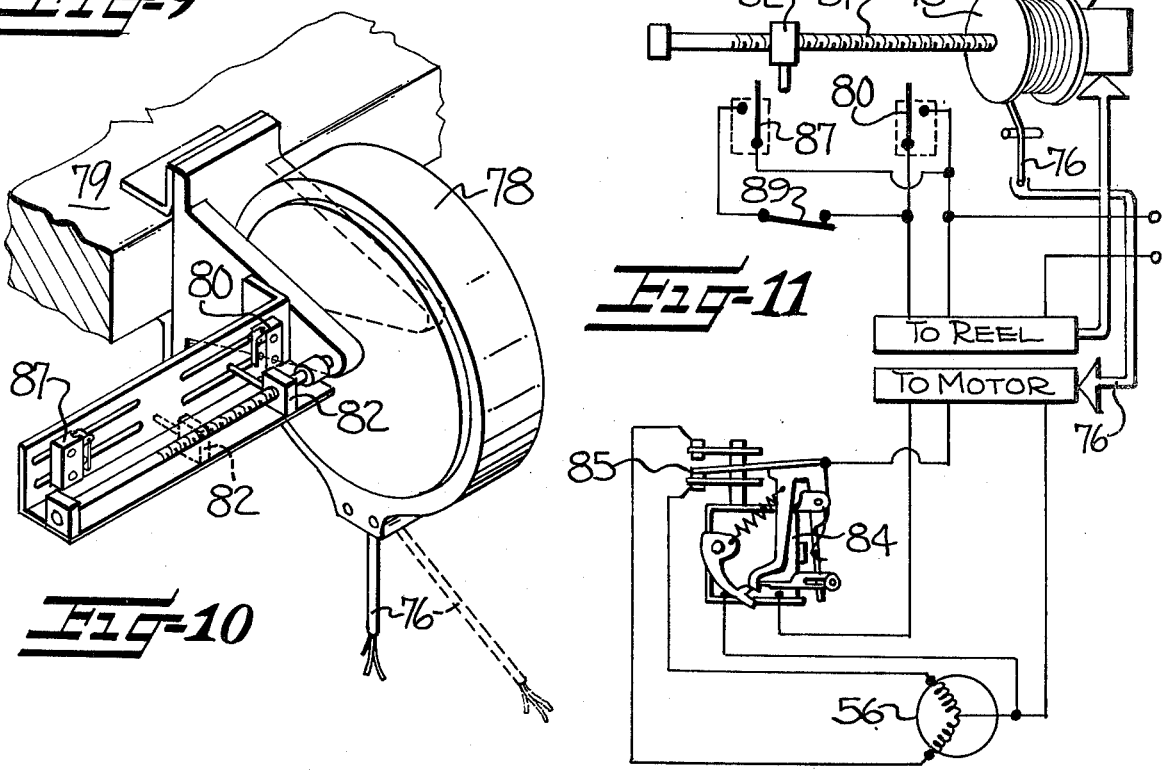

CLEANING DEVICE FOR SEDIMENTATION TANK

The present invention relates to a cleaning device for a sedimentation tank useful in the treatment and purification of water, and which is characterized by the highly efficient collection and removal of the sediment from the bottom of the tank without requiring the draining thereof.

Water processing systems are commonly used in association with public water supply systems, sewage disposal, industrial waste treatment, or the like, to render the water more suitable for its intended use, or to permit the waste to be disposed of in an environmentally safe manner. One such treatment process involves the use of a relatively large sedimentation tank, wherein the raw water is retained for a period ranging from a few hours to several days to permit any silt, clay or other fine material to settle to the bottom. Typically, the water flows at a slow rate of speed horizontally through the tank, with the raw water entering at one end and being discharged over a weir at the opposite end.

Since sedimentation alone may not remove the extremely fine or colloidal material in a reasonable period of time, it is common to employ a coagulation treatment prior to the sedimentation process. More particularly, coagulation of the extremely fine materials is achieved by gently mixing the raw water with an iron or aluminum salt, with the salt acting to form insoluble hydroxide floc. The floc in turn serves to absorb the fine particles and other undesirable substances from the raw water, so that the coagulated particles will more readily settle to the bottom of the sedimentation tank.

In conventional sedimentation processes, the tank is periodically taken out of operation and drained so that the sediment may be manually removed therefrom. As will be apparent, this is a laborious operation, and the resulting down time significantly reduces the efficiency of the process. In addition, a back-up tank is required if continuous water processing is required.

Various arrangements have heretofore been proposed for the purpose of periodically removing the sediment from the tank without requiring the tank to be drained, but such prior proposals have employed complex and inefficient equipment for this purpose. For example, the patent to Easterday, U.S. Pat. No. 2,866,557 discloses a sedimentation basin having a longitudinally reciprocating floor cleaning apparatus for moving the sediment to a gutter in the bottom of the tank so that the sediment may be removed through a discharge conduit. The floor cleaning apparatus includes a plurality of pivoting wiper blades which are reciprocated by a complex cable and pulley arrangement. While the cleaning apparatus of the type shown in the Easterday patent undoubtedly represents an improvement for conventional tanks which must be periodically drained, it is apparent that the use of a complex cable and pulley arrangement to reciprocate the cleaning apparatus will be a source of difficulty in that the cables are subject to failure due to breakage or separation from the pulleys. In addition, the cables may stretch, resulting in misalignment and the possible malfunctioning of the cleaning apparatus in the tank.

It is accordingly an object of the present invention to provide a sedimentation apparatus which permits the sediment to be periodically and efficiently removed without draining the water from the tank.

It is another object of the present invention to provide a floor cleaning device for a sedimentation tank which is of simple and compact construction, and which incorporates a self-contained, direct drive system which does not employ a complex cable and pulley arrangement.

It is still another object of the present invention to provide a floor cleaning device for a sedimentation tank which is movably mounted in the tank on a submerged supporting structure which maintains the accurate alignment of the device during reciprocation across the floor of the tank.

It is a further object of the present invention to provide a sedimentation apparatus having a reciprocating floor cleaning device which incorporates means for selectively controlling the length of the reciprocatory movement, as well as the speed of movement thereof, to thereby permit efficient operation of the tank under varying conditions of water turbidity.

These and other objects and advantages of the present invention are achieved in the embodiment illustrated herein by the provision of a cleaning device for a sedimentation tank having a side wall, and at least one sediment collection gutter in the bottom wall thereof. The cleaning device includes an assembly having a depending wiper blade, and means for mounting the assembly within the tank and including a rail positioned along the lower portion of the side wall of the tank. The cleaning assembly is moved along a path of travel across the bottom wall or floor of the tank by drive means which preferably comprises a gear tooth rack carried by the rail, a shaft rotatably carried by the assembly, a pinion mounted on the end of the shaft and operatively engaging the gear tooth rack of the side rail, and a submersible electric motor carried by the cleaning assembly and operatively connected to the shaft. By this arrangement, the assembly may be moved along its path of travel with the depending wiper blade collecting the sediment and conveying the same to the gutter where it may be periodically removed by a drain flushing system.

In the preferred embodiment, the tank has a rectangular outline, with a gutter positioned adjacent each end wall. Further, a supporting rail is mounted along each side wall of the tank so as to support the cleaning assembly therebetween, and the drive means includes a rack and pinion associated with each of the rails to result in a positive drive force at each end of the assembly.

The electric motor is preferably reversible, such that the direction of movement of the assembly may be reversed by reversing the motor. The speed of the motor is also adjustable to compensate for varying conditions of water turbidity, and control means are provided for selectively adjusting the length of the reciprocatory movement of the cleaning assembly. To accurately maintain the alignment of the cleaning assembly within the tank during its reciprocatory movement, there is provided a pair of spaced apart guide rollers at each end of the assembly, with the periphery of the rollers engaging the side edges of the adjacent supporting rail at spaced apart points.

Some of the objects having been stated, other objects will appear as the description proceeds, when taken in connection with the accompanying drawings, in which FIG. 1 is a fragmentary perspective view of two adjacent sedimentation tanks which embody the features of the present invention;

FIG. 8 is a sectional elevation view of a sedimentation tank and cleaning assembly in accordance with the present invention, and illustrating another embodiment of the control means for reciprocating the assembly;

FIG. 9 is a fragmentary plan view of the end portion of the cleaning assembly and supporting rail of the embodiment of FIG. 8;

FIG. 10 is a perspective view of the reel for supporting the electrical cable leading to the electric motor of the cleaning assembly of FIG. 8; and FIG. 11 is a schematic view of the reel and electrical control system for reversing the cleaning assembly as shown in FIG. 8.

Figure 1:
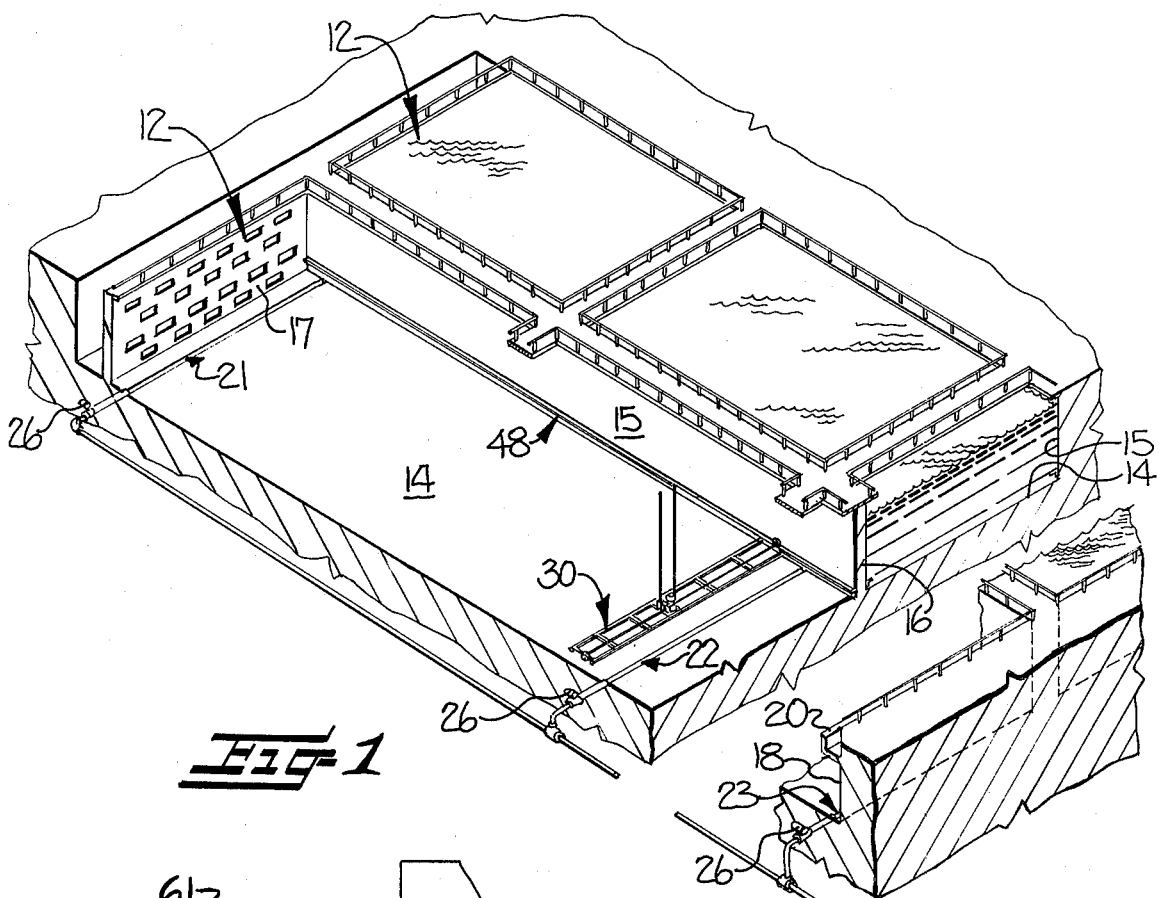

Referring more specifically to the drawings, FIG. 1 illustrates a pair of like sedimentation apparatus, each of which embodies the present invention. Each apparatus comprises a tank 12 of generally rectangular outline, and having a flat bottom wall 14, opposite side walls 15, 16 and opposite end walls 17, 18. One end wall 17 is in the form of a perforated barrier which permits the water to enter therethrough and flow horizontally across the tank in a generally laminar fashion, and a weir 20 is positioned at the opposite end wall 18 for removal of the water. Typically, the tank is about 12 feet deep, and measures between about 25 to 40 feet in width and 70 to 100 feet in length.

Figure 3:
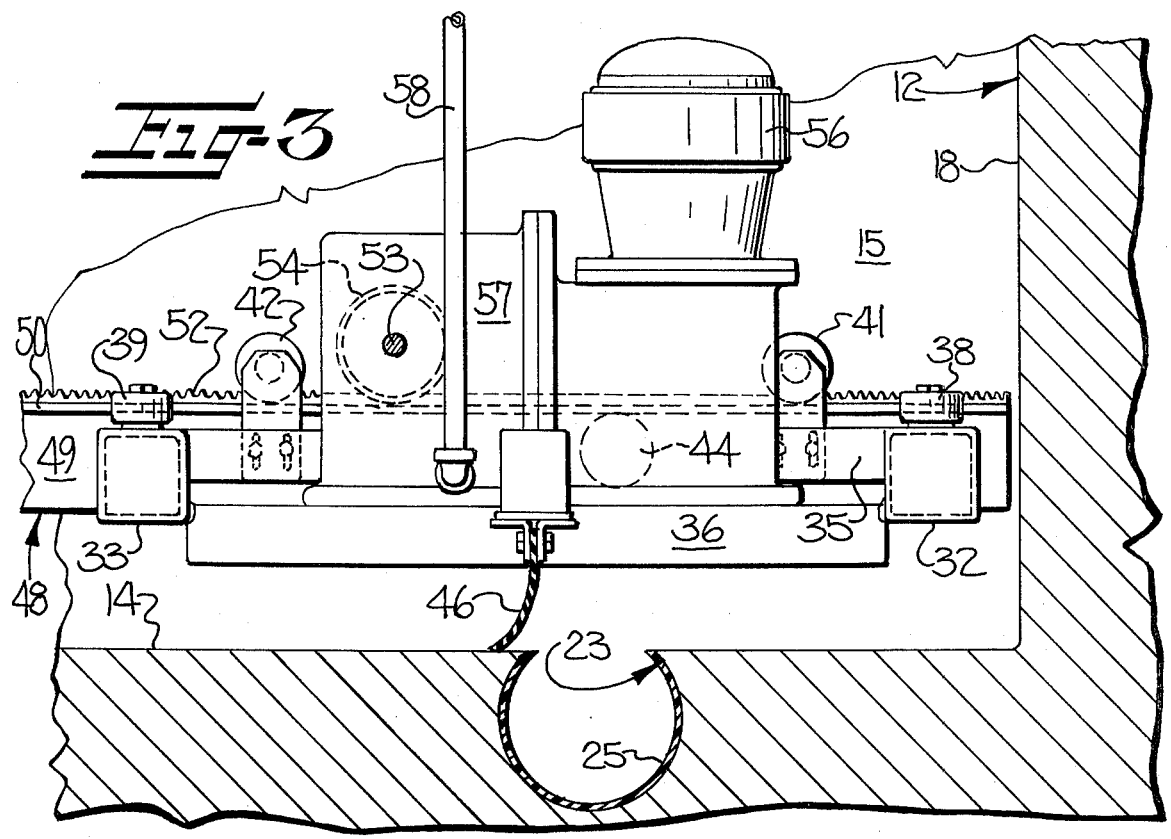
FIG. 3 is a sectional elevation view of the cleaning assembly and taken substantially along the line 3—3 of FIG. 2, and illustrating the assembly adjacent one end wall of the tank.

Three sediment collection gutters 21, 22, 23 are formed in the bottom wall 14 of the tank, with the gutters 21 and 23 being positioned about 18 inches from the end walls 17 and 18 respectively, and the gutter 22 being positioned at a central location. The gutters are disposed to extend transversely across the tank, and they extend substantially the full distance from one side wall to the other. Each gutter has an outline in the form of an arc of a circle as best seen in FIG. 3, and which measures about 8 inches in diameter. The circular outline has been found to result in an efficient flushing operation as hereinafter further described, and in addition, the gutters may include a plastic liner 25 which facilitates the fabrication thereof in the bottom wall. More particularly, each gutter may be formed by placing a circular plastic pipe in the concrete at the time the bottom wall is formed, and such that the upper portion of the pipe extends slightly above the bottom wall surface. This upper portion may then be removed by cutting or the like to produce the finished gutter. To periodically remove the collected sediment from the gutters, each is connected to a drain and flushing valve 26 which serves to flush the water along the gutter and thereby remove the sediment to a waste holding tank or the like.

A cleaning assembly 30 is mounted for reciprocation within the tank 12 to collect the sediment and convey the same to the gutters 21–23 where it may be periodically removed through the flushing valves 26. The cleaning assembly 30 comprises a generally rectangular framework having opposite side members 32, 33, opposite end members 34, 35, and a number of intermediate cross members 36. These structural members may be fabricated from a variety of conventional materials, and as illustrated, the side members 32, 33 are fabricated from hollow steel tubing which contributes to the buoyance of the assembly and thereby reduces its weight when positioned beneath the water. The assembly 30 is of a length to extend substantially the full distance transversely across the tank and between the side walls 15, 16 thereof.

A number of rollers are mounted on the end members of the apparatus 30 for the purpose of supporting the assembly and maintaining its alignment in a manner hereinafter further described. These rollers comprise a pair of spaced apart guide rollers 38, 39 mounted for rotation about a vertical axis, a pair of spaced apart supporting rollers 41, 42 mounted for rotation about a horizontal axis which is generally perpendicular to the adjacent side wall, and an anti-lift roller 44 mounted for rotation about a horizontal axis which is parallel to the axes of the supporting rollers 41, 42.

The cleaning assembly 30 further comprises a downwardly depending wiper blade 46 which extends along the full length of the apparatus, and thus extends substantially from one side wall of the tank to the other side wall. The wiper blade 46 is fabricated from a flexible, relatively heavy fabric or rubber-like belting material, and is adapted to move across the bottom wall of the tank during reciprocation of the apparatus as hereinafter further described.

Figure 4:
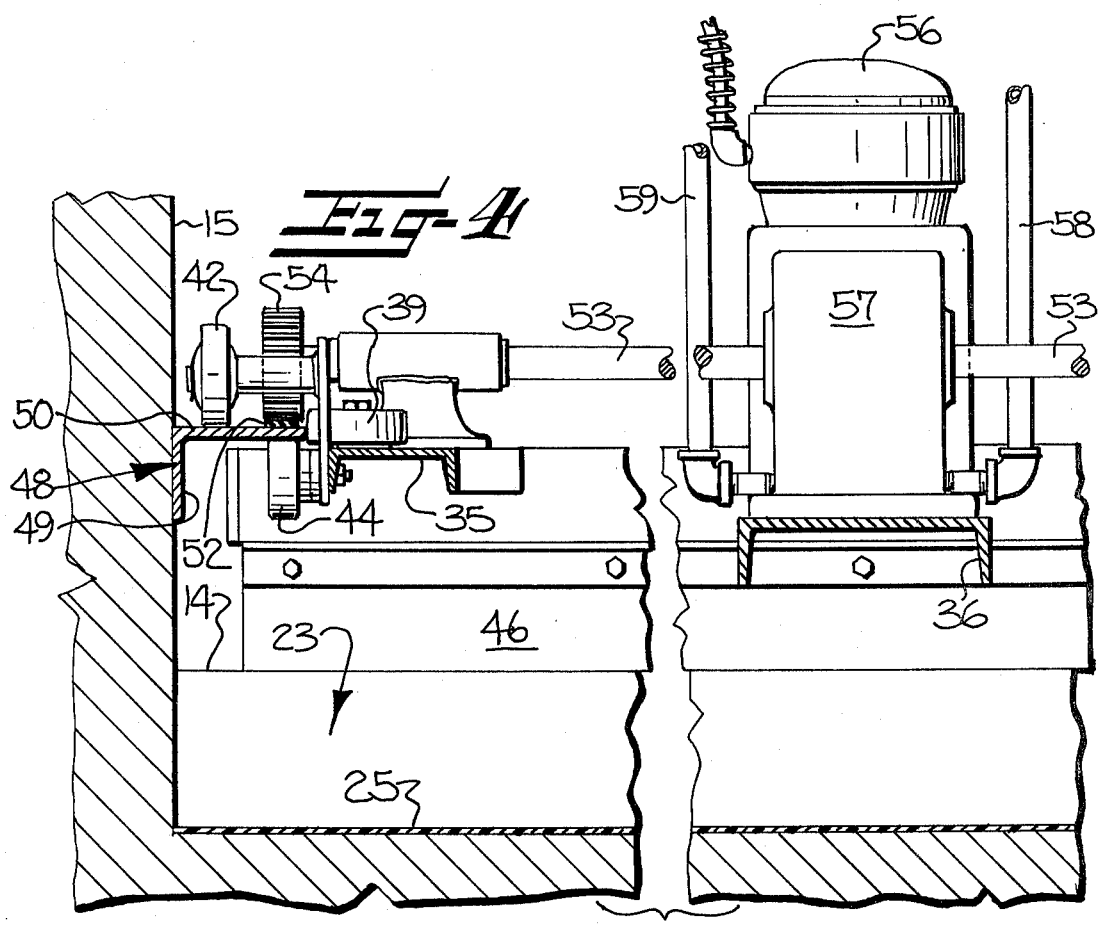
FIG. 4 is a sectional elevation view of a portion of the cleaning assembly, together with the adjacent portion of the side wall of the tank.

To support the cleaning assembly 30 for reciprocatory movement within the tank 12, there is provided a horizontally disposed supporting rail 48 positioned along the lower portion of each side wall. As best seen in FIG. 4, the rail 48 comprises a metal angle having one leg 49 fixedly attached to the side wall of the tank and another leg 50 extending horizontally therefrom. The two supporting rollers 41, 42 at each end of the assembly rest upon the horizontal leg 50, such that the weight of the assembly is supported thereon. In addition, the anti-lift roller 44 is disposed along the undersurface of the horizontal leg 50 to prevent the assembly from lifting therefrom, and the guide rollers 38, 39 engage the side edges of the leg 50 at spaced apart locations. Typically, the guide rollers 38, 39 are spaced apart a distance of about 36 inches in the case of an assembly having a longitudinal length of about 24 feet, and they serve to maintain the accurate alignment of the assembly during its reciprocatory movement.

To reciprocate the assembly 30 along its path of travel between the end walls 17, 18, there is provided drive means which comprises a gear tooth rack 52 mounted upon the horizontal leg 50 of each of the rails 48, a shaft 53 rotatably carried by the assembly 30 and extending along the full longitudinal length thereof, and a pinion 54 mounted on each end of the shaft 53 and operatively engaging the gear tooth rack 52 of the associated rail. In addition, the assembly carries a submersible electric motor 56 which is operatively connected to the shaft 53 through a gear box 57. The electric motor 56 is reversible, and it is adapted to be controlled to operate at varying speeds in the manner well known in the art.

The gear box 57 includes two lubricating vent pipes 58, 59 which extend upwardly therefrom to a point above the normal water level in the tank. The vent pipes 58, 59 are adapted to permit the lubricating oil in the gear box 57 to be periodically changed without draining the tank, with one pipe serving as the entry port for the fresh oil and the other pipe serving as the drain.

Figure 2:
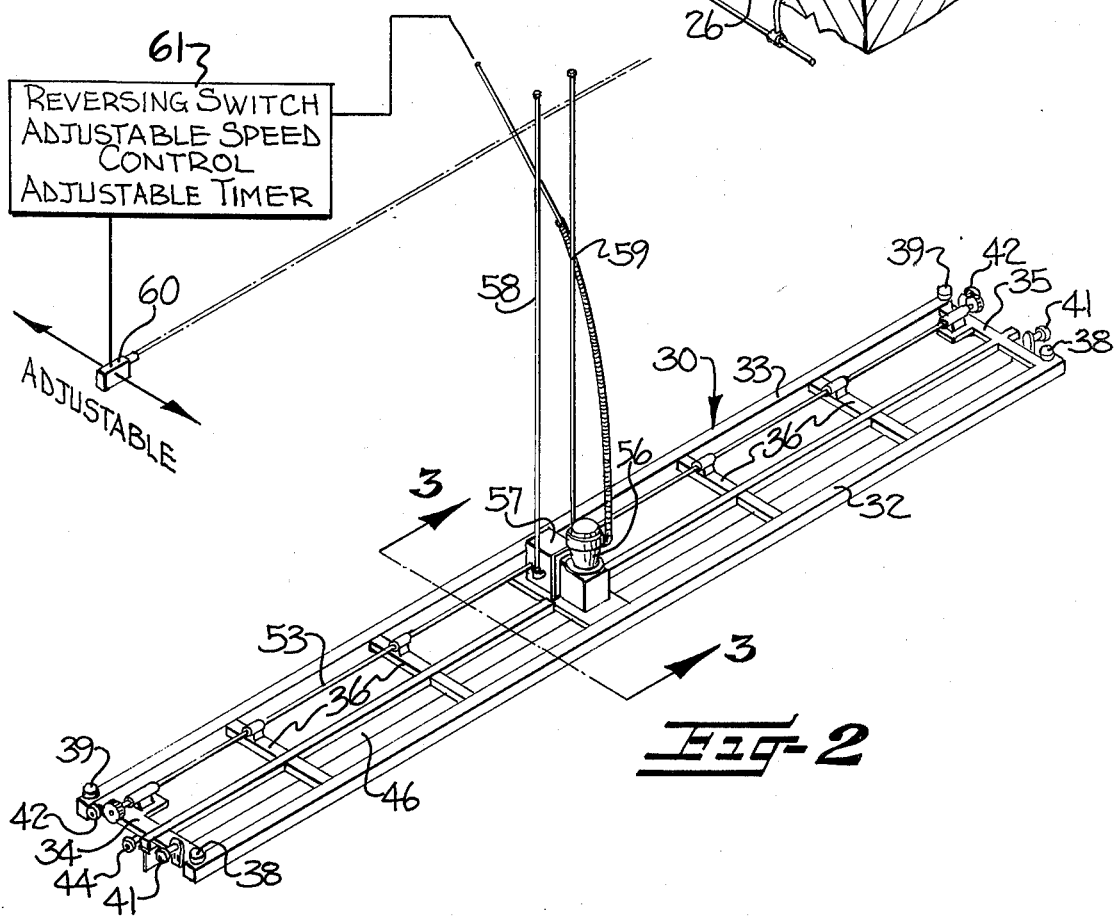
FIG. 2 is a fragmentary perspective view of the cleaning assembly shown in FIG. 1, together with a schematic representation of the associated electrical control means.

The drive means for the assembly further includes means for selectively reversing the direction of rotation of the shaft 53 to thereby reverse the direction of movement of the assembly and permit the same to reciprocate between the gutters 21, 23 at the end walls. This reversing means includes the two vent pipes 58, 59 as described above, and an electric eye 60 mounted adjacent each end of the tank and above the normal water level. Each electric eye 60 is operatively connected to an electrical switch in the circuit indicated schematically at 61 in FIG. 2, with the switch serving to reverse the direction of the electric motor 56. Thus the vent pipes 58, 59 serve as a control rod for actuating the electric eyes 60 and reversing the motor 56 when the assembly 30 reaches a predetermined position adjacent each end of the tank.

Each electric eye 60 may be adjustably mounted along the length of the tank, such that the length of the reciprocatory movement of the assembly may be selectively varied. For example, where heavy concentrations of silt occur along the entry end portion of the tank, the cleaning assembly 30 may be programmed to reciprocate through only one-half the length of the tank and between the gutters 21 and 22. This may be readily accomplished by positioning one of the electric eyes 60 adjacent the center of the tank.

In operation, the water to be treated enters the tank through the wall 17 and flows slowly toward the opposite end wall 18. The electric motor 56 is energized to move the assembly 30 along its path of travel, with the speed being adjustably controlled based upon the turbidity of the water. Thus, for example, in water of low turbidity, the assembly typically moves at a speed of 1 inch per minute, and at higher turbidity, it would move at a higher rate of speed. When the assembly reaches an end wall such as shown in FIG. 3, the electric eye 60 is actuated by the vent pipes 58, 59 to reverse the motor. Thus the wiper blade 46 is moved across the length of the bottom wall of the tank and to each of the gutters 21-23 to thereby collect and deposit the sediment therein. At suitable intervals, the flushing valves 26 are opened to flush the sediment from the gutters and into a waste holding tank (not shown).

By controlling the speed of operation of the motor 56, a substantially constant rate of sediment movement may be maintained under varying turbidity conditions, thereby permitting the assembly to be continuously operated under conditions of maximum efficiency. In addition, an adjustable timer may be positioned in the control circuit 61 to hold the motor in a non-operative condition for a predetermined period of time at the end of each stroke. The timer thus permits intermittent or continuous operation of the cleaning assembly, and thereby provides an additional control for assuring the most efficient operation of the assembly under all turbidity conditions.

The gear box 57 of the drive motor 56 may alternatively be of a permanently lubricated type, in which event the vent pipes 58, 59 would be unnecessary. In such case, a separate control rod (not shown) would be mounted on the assembly for actuating the electric eye control system.

Under normal operating conditions, the flushing of the gutters will sweep away the sediment which collects between the wiper blade 46 and end wall 18 as seen in FIG. 3. However, under certain conditions, it may be necessary to include provision for physically moving such sediment into the gutters. The embodiments of the cleaning assembly shown in FIGS. 5-7 are designed for this purpose.

Figure 5:
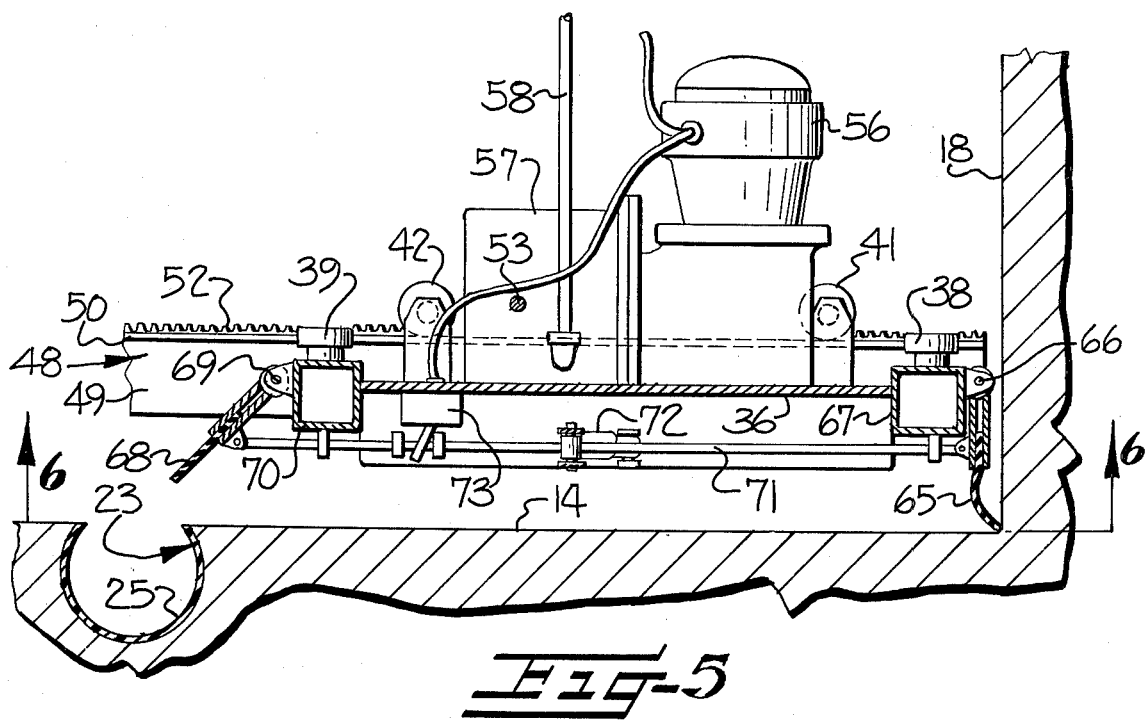
FIG. 5 is a view similar to FIG. 3, but illustrating a second embodiment of the cleaning assembly.
Figure 6:
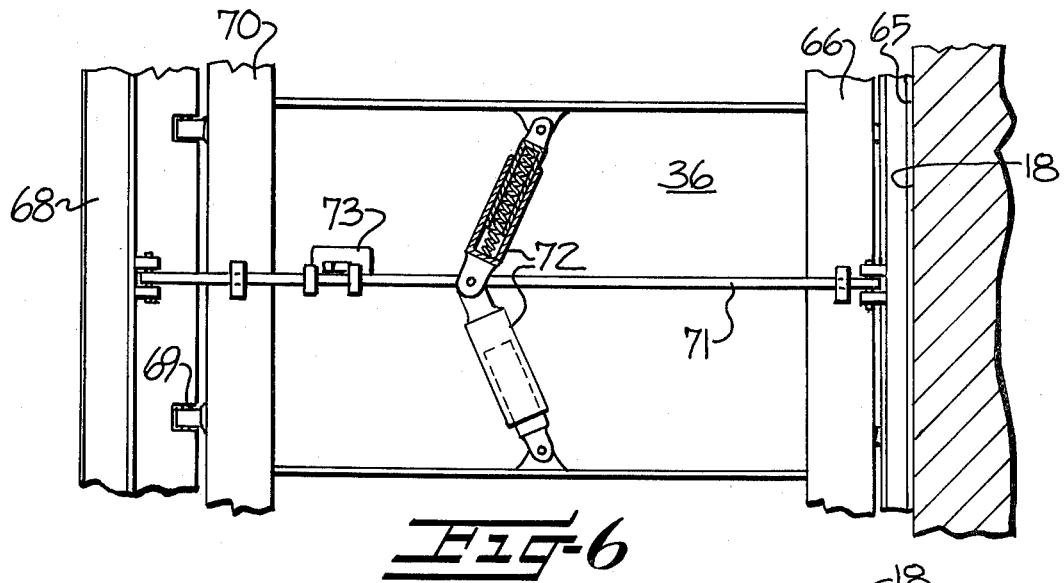
FIG. 6 is a fragmentary plan view of the cleaning assembly and taken substantially along the line 6—6 of FIG. 5.

In the embodiment of FIGS. 5 and 6, the cleaning assembly 62 comprises a framework generally similar to the framework of the assembly 30, and which further includes a first depending wiper blade 65 pivotally mounted to the framework by means of a hinge 66 extending along the side member 67, and a second depending wiper blade 68 pivotally mounted to the framework along a hinge 69 on the opposite side member 70. The two wiper blades 65, 68 are generally parallel to each other, and they are interconnected to permit concurrent pivotal movement by a laterally directed control rod 71. By this arrangement, the two blades are movable between a first orientation (shown in FIG. 5) wherein the blade 65 is disposed in a depending operative position and the other blade 68 is disposed in an inclined non-operative position, and a second orientation (not shown) wherein the relative positioning of the blades is reversed. Thus as seen in FIG. 5, the assembly is set to move toward the left, with the blade 65 serving to collect the sediment which lies immediately adjacent the wall 18 and sweep the same into the gutter 23. The blades 65, 68 are releasably retained in each of these two orientations by means of the over-the-center spring biasing mechanism 72 as illustrated in FIG. 6. In addition, a reversing switch 73 is carried by the assembly 62 so as to be actuated by the movement of the blades from one orientation to the other to thereby reverse the motor 56.

When the assembly 62 in the orientation shown in FIG. 5 reaches the wall 17, the forward non-operative blade 68 will strike the wall 17 causing the same to be pushed toward the right until the spring retaining mechanism 72 is moved past its center position, to thereby result in the orientation being reversed. Concurrently, the switch 73 serves to reverse the motor 56 so that the assembly moves toward the right. When the end wall 18 is again reached, the blade 65 will initially contact the same and will be moved back to the position shown in FIG. 5 to repeat the cycle.

Figure 7:
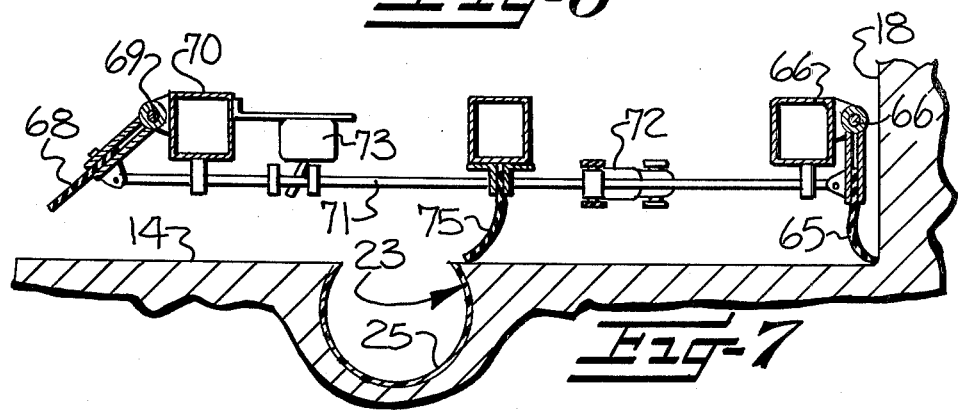
FIG. 7 is a fragmentary sectional elevation view of still another embodiment of the cleaning assembly of the present invention.

The embodiment of FIG. 7 is generally similar to the embodiment of FIGS. 5 and 6, with the exception that an additional, non-pivoting wiper blade 75 is positioned along the central portion of the assembly to further facilitate the collection of the sediment.

FIGS. 8-11 illustrate another embodiment of the means for reversing the direction of rotation of the shaft 53 to obtain the desired reciprocatory movement of the cleaning assembly 30. In this embodiment, the reversing means comprises a line 76 having one end portion attached to the assembly 30, a reel 78 rotatably mounted above the normal water level of the tank 12 and having the other end portion of the line 76 would thereupon. The reel 78 is mounted at a central position above the tank on a catwalk 79 or other structure provided for this purpose, and it is of the spring biased type such that the line 76 may be withdrawn from the reel and automatically rewound when the line is returned.

An electrical limit switch 80 is mounted adjacent the reel and is controlled by a predetermined rotation of the reel for reversing the electric motor. More particularly, a threaded shaft 81 is coaxially mounted for rotaton with the reel, and a non-rotatable follower 82 is threadedly engaged by the shaft, such that the follower is moved laterally upon rotation of the shaft 81. With the assembly 30 positioned at a central location as shown in solid lines in FIG. 8, the line 76 is substantially fully wound upon the reel 78 and the follower 82 is located at the position shown in FIG. 11. When the assembly 30 moves for example toward the right, the line 76 is unwound and the follower moves toward the limit switch 80. By design, the switch 80 is contacted and actuated when the assembly reaches a predetermined position adjacent the end wall 18 and the motor 56 is reversed and held in such direction of operation by the conventional latching relay 84 and reversing switch 85. Further details regarding the structure and operation of the latching relay 84 may be obtained by reference to the U.S. patent to Hamrick, U.S. Pat. No. 3,464,859. As the assembly 30 returns to the left, the reel 78 initially rewinds the line and then again unwinds when the assembly passes the midpoint of the tank. As the assembly continues toward the left, the follower 82 will eventually again actuate the switch 80 to reverse the latching relay 84 and motor 56.

In cases where it is desired that the assembly reciprocate through only one-half the length of the tank, a second limit switch 87 may be mounted adjacent the threaded shaft 81 and at a point which is adapted to be engaged by the follower 82 when the assembly is at its midpoint. Actuation of the switch 87 also serves to reverse the motor 56 and latching relay 84, such that the direction of movement is reversed when the assembly reaches midpoint. To provide selective operation in this regard, the switch 87 may be de-activated by opening the control switch 89 to thereby result in reciprocation along the full length of the tank. In the preferred embodiment, the line 76 comprises the electrical power cable leading to the motor 56.

In the drawings and specification, there has been set forth a preferred embodiment of the invention, and although specific terms are employed, they are used in a generic and descriptive sense only and not for purposes of limitation.

That which is claimed is:

1. A sedimentation apparatus useful in water treatment systems and the like, and characterized by a highly efficient cleaning system for collecting and removing the sediment therefrom, and comprising
   a rectangular tank having a generally flat bottom wall, opposite side walls, opposite end walls, and at least one sediment collection gutter in the bottom wall which is disposed to substantially extend from one side wall to the other side wall,
   a cleaning assembly including a depending wiper blade, said assembly and blade each having a length to substantially extend from one side wall to the other side wall,
   means supporting said cleaning assembly within said tank and below the intended level of the water in the tank and so as to substantially extend between said side walls, and with said assembly being movable along a reciprocatory path of travel between said end walls while said wiper blade moves across the bottom wall of the tank and to said gutter, said supporting means comprising a horizontally disposed rail positioned along the lower portion of each side wall,
   drive means for reciprocating said assembly along its path of travel and comprising a gear tooth rack carried by each of said rails, shaft means rotatably carried by said assembly, a pinion mounted on each end of said shaft means and with each pinion operatively engaging the gear tooth rack of one of the side rails, and a submersible electric motor carried by said assembly and operatively connected to said shaft means, and with said shaft means, pinions, and electric motor being disposed below the intended level of the water in the tank, and
   drain means operatively connected to said gutter to permit periodic removal of the collected sediment from said gutter,
   whereby the cleaning assembly may be moved along its path of travel by said drive means and with the depending wiper blade collecting the sediment and conveying the same to said gutter where it may be periodically removed through said drain means.

2. The sedimentation apparatus as defined in claim 1 wherein said gutter has an outline in the form of an arc of a circle and includes a plastic lining.

3. The sedimentation apparatus as defined in claim 2 wherein said drive means further comprises electrical control means for selectively reversing said electric motor and for operating said motor at a selectively variable speed.

4. The sedimentation apparatus as defined in claim 1 wherein said tank includes at least two gutters, with one gutter being disposed adjacent and parallel to each end wall, and said drain means is operatively connected to each of said gutters.

5. The sedimentation apparatus as defined in claim 4 wherein said drive means further includes means for selectively reversing the direction of rotation of said shaft means to reverse the directon of movement of said assembly.

6. The sedimentation apparatus as defined in claim 5 wherein said reversing means comprises a rod mounted on said assembly and extending upwardly therefrom so as to extend above the normal water level in said tank, a pair of electric eye means mounted along the side walls of said tank and above said normal water level, and electrical switch means controlled by each of said electric eye means for reversing said electrical motor, whereby the rod serves to actuate said electric eye means and reverse the motor when the assembly reaches a predetermined position corresponding to the position of each of said electric eye means.

7. The sedimentation apparatus as defined in claim 6 wherein said reversing means further comprises means for adjustably mounting said electric eye means to permit selective placement thereof along the length of said tank, whereby the length of the reciprocatory movement of the assembly may be selectively controlled.

8. The sedimentation apparatus as defined in claim 5 wherein said reversing means comprises a line having one end portion attached to said assembly, a reel rotatably mounted above the normal water level of said tank and having the outer end portion of said line wound thereupon, spring biasing means for rewinding said line on said reel after having been withdrawn therefrom, and electrical switch means controlled by a predetermined rotation of said reel for reversing said electrical motor, whereby a predetermined rotation of said reel caused by the movement of said assembly and the resulting withdrawal of said line from said reel serves to actuate said switch means and reverse the electrical motor.

9. The sedimentation apparatus as defined in claim 8 wherein said line comprises an electrical power cable which is operatively connected to said electric motor.

10. The sedimentation apparatus as defined in claim 1 wherein said cleaning assembly comprises a framework having an end portion adjacent each side wall and rail, and with each end portion including guides which are spaced apart from each other in a direction parallel to the adjacent side wall and with each guide contacting one of said side wall and rail, whereby said guides serve to maintain proper aligment of said framework during the reciprocating movement of the apparatus.

11. The sedimentation apparatus as defined in claim 10 wherein said guides on each end portion of said assembly comprise a pair of guide rollers mounted for rotation about a vertical axis, and with the periphery of said guide rollers engaging the side edges of the adjacent rail.

12. The sedimentation apparatus as defined in claim 11 wherein each of said rails is fixedly mounted on the adjacent side wall, and said supporting means further comprises at least one supporting roller carried by each end portion of said assembly and mounted for rotation about a horizontal axis which extends substantially perpendicular to the adjacent side wall, and with each such supporting roller resting upon the adjacent rail.

13. The sedimentation apparatus as defined in claim 12 wherein said supporting means further comprises at least one anti-lift roller carried by each end portion of said assembly and mounted for rotation about a horizontal axis which extends substantially perpendicular to the adjacent side wall, and with each such anti-lift roller disposed to engage the undersurface of said rail to thereby preclude the lifting of said assembly from said rail.

* * * * *

UNITED STATES PATENT AND TRADEMARK OFFICE
CERTIFICATE OF CORRECTION

PATENT NO. : 4,080,291
DATED : March 21, 1978
INVENTOR(S) : James Raymond Sturgill It is certified that error appears in the above-identified patent and that said Letters Patent are hereby corrected as shown below:

Column 6, Line 65, "would" should be --wound--.
Column 8, CLAIM 8, Line 64, "outer" should be --other--.

Signed and Sealed this

Eighteenth Day of July 1978

[SEAL]

Attest:

RUTH C. MASON
*Attesting Officer*

DONALD W. BANNER
*Commissioner of Patents and Trademarks*